(12) United States Patent
Nagata

(10) Patent No.: US 9,257,733 B2
(45) Date of Patent: Feb. 9, 2016

(54) OXYGEN PERMEABLE MEMBRANE FOR AIR SECONDARY BATTERY, ARMOURING MATERIAL FOR AIR SECONDARY BATTERY AND SECONDARY BATTERY

(71) Applicant: SHOWA DENKO PACKAGING CO., LTD., Isehara-shi, Kanagawa-ken (JP)

(72) Inventor: Kensuke Nagata, Hikone (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 127 days.

(21) Appl. No.: 14/104,163

(22) Filed: Dec. 12, 2013

(65) Prior Publication Data

US 2014/0170508 A1    Jun. 19, 2014

(30) Foreign Application Priority Data

Dec. 17, 2012 (JP) .................. 2012-274799

(51) Int. Cl.
*H01M 2/00* (2006.01)
*H01M 2/08* (2006.01)
*H01M 12/02* (2006.01)
*H01M 12/08* (2006.01)

(52) U.S. Cl.
CPC .............. *H01M 12/02* (2013.01); *H01M 12/08* (2013.01); *Y02E 60/50* (2013.01)

(58) Field of Classification Search
USPC .................................. 429/175, 163; 96/4, 11
IPC .................................................. H01M 2/00,2/08
See application file for complete search history.

(56) References Cited

U.S. PATENT DOCUMENTS

| 2010/0132559 A1* | 6/2010 | Ishida et al. .................. 96/5 |
| 2013/0112077 A1* | 5/2013 | Rosati ............................ 96/4 |
| 2014/0116944 A1* | 5/2014 | Hu et al. ..................... 210/650 |

FOREIGN PATENT DOCUMENTS

| JP | 2002-201426 A | 7/2002 |
| JP | 2003-41155 A  | 2/2003 |
| JP | 2005-171061 A | 6/2005 |
| JP | 4431822 B2    | 3/2010 |
| JP | 2011-96492 A  | 5/2011 |
| JP | 2011-246669 A | 12/2011 |

* cited by examiner

*Primary Examiner* — Patrick Ryan
*Assistant Examiner* — Julian Anthony
(74) *Attorney, Agent, or Firm* — Sughrue Mion, PLLC

(57) ABSTRACT

Provided is an oxygen permeable membrane for use in an air secondary battery, which excels in oxygen permeability, barrier performance to water, being capable of preventing electrolyte from leaking out. Such an oxygen permeable membrane includes a thermoplastic resin membrane and inorganic particles having pores having pore diameter of 10 Å or less contained in the thermoplastic resin membrane, in which the thermoplastic resin membrane has one surface on which hydrophobic treatment is effected.

9 Claims, 2 Drawing Sheets

OXYGEN PERMEABLE MEMBRANE FOR AIR SECONDARY BATTERY, ARMOURING MATERIAL FOR AIR SECONDARY BATTERY AND SECONDARY BATTERY

BACKGROUND OF THE INVENTION

Field of the Invention

The present invention relates to an oxygen permeable membrane for air secondary battery, an armouring material for air secondary battery and an air secondary battery. Priority is claimed on Japanese Patent Application No. 2012-274799, filed Dec. 17, 2012, the content of which is incorporated herein by reference.

Corresponding to miniaturization and portability of electronic devices such as a video camera, a notebook-sized personal computer, a cellular phone, downsizing and light-weighting have been required to the battery which is the driving force, high-performance lithium secondary batteries have been spread.

Recently, upsizing of lithium secondary batteries is considered in order to apply lithium secondary batteries to an in-vehicle electric power supply of an electric vehicle or a hybrid vehicle.

Now, since a space for onboard electric power supply in a vehicle is limited and shape of the space for onboard electric power supply is unsettled, downsizing (slimming), light-weighting and freeing of shape are required to a lithium secondary battery for onboard electric power supply in a vehicle, similarly to the circumstances of electronic device. For example, as an armouring material of such a lithium secondary battery, the armouring sheet disclosed in the following Patent Document 1 is known. The armouring sheet disclosed in Patent Document 1 is constituted by laminating an outer layer made of a resin layer, with an inner layer made of aluminum foil and a resin layer, in which the resin layer of the inner layer is equipped with heat-sealing properties. Such an armouring sheet is processed into a bag to form a packaging container, cells are inserted into the resultant container, then heat-sealing the inner layers of the armouring sheet with each other, thereby obtaining a lithium secondary battery which excels in both sealing and degree of free of shape.

In addition, recently, an air secondary battery attracts attention, the air secondary battery using lithium or aluminium as a negative electrode active material, and atmospheric oxygen in the air as a positive electrode active material.

Since the air secondary battery uses atmospheric oxygen as a positive electrode active material, improvement of energy density per battery volume is expected.

For example, in a lithium air secondary battery, which is a kind of an air secondary battery, a metal lithium as a negative electrode active material, and the electrolyte are sealed by an armouring material, the armouring material is equipped with a port part for taking oxygen in, and an air electrode is applied to the port part (see Patent Document 2). The air electrode is composed of an oxygen-permeable membrane and a catalyst layer, the oxygen-permeable membrane is joined to the port part, thereby placing the air electrode at the port part. As an oxygen-permeable membrane, for example, a porous ceramic material is known. As for an armouring material, adoption of an armouring sheet for the use of conventional lithium secondary battery has been considered.

PRIOR ART DOCUMENTS

Patent Documents

[Patent Document 1] Japanese Patent No. 4,431,822
[Patent Document 2] Japanese Patent Laid-Open No. 2011-96492

SUMMARY OF THE INVENTION

Problem to be Solved by the Invention

However, in the conventional air secondary battery, joining strength between an oxygen permeable membrane made of porous ceramic material and armouring sheet was insufficient. Because of this, in the conventional air secondary battery, there is a problem that electrolyte leaks out or water penetrates through the joining portion between the oxygen permeable membrane and the armouring sheet to shorten the life of the air secondary battery. In addition, there was the case where leaking of electrolyte or penetration of water through the oxygen- permeable itself, thereby shortening the life of the air secondary battery.

The present invention was made in view of the aforementioned circumstances. It is an object of the present invention to provide an armouring material for the use of a secondary battery, having excellent joining performance between an oxygen-permeable membrane and the armouring sheet, the oxygen-permeable membrane excelling in oxygen-permeability and water-barrier property, being capable of preventing electrolyte from leaking out. In addition, it is another object of the present invention to provide an air secondary battery equipped with an oxygen-permeable membrane which excels in oxygen-permeability and water-barrier property, being capable of preventing electrolyte from leaking out.

Means to Solve the Problem

[1] An oxygen-permeable membrane for the use of an air secondary battery, comprising a thermoplastic resin membrane and inorganic particles having pores having pore diameter of 10 Å or less contained in the thermoplastic resin membrane, wherein the thermoplastic resin membrane has one surface on which hydrophobic treatment is effected.

[2] The oxygen-permeable membrane for the use of an air secondary battery as set forth in [1], wherein the inorganic porous particles are made of one or more selected from the group consisting of zeolite, anodic oxidation alumina, porous alumina, porous titania, porous zirconia, porous carbon, and porous silica.

[3] The oxygen-permeable membrane for the use of an air secondary battery as set forth in [1] or [2], wherein the thermoplastic membrane is made of polyethylene, polypropylene, polystyrene resin or polyurethane resin.

[4] The oxygen-permeable membrane for the use of an air secondary battery as set forth in any one of [1] to [3], wherein the hydrophobic treatment is applying of silane treatment agent having hydrophobic functional groups.

[5] An armouring material for the use of an air secondary battery, comprising
an armouring sheet constituted by laminating an outer layer including heat-resistant resin film, a metal foil layer, and an inner layer including a thermoplastic resin film, being equipped with an opening part for taking oxygen in, perforating through the outer layer, the metal foil layer and the inner layer, and an oxygen-permeable membrane being joined to the inner layer side in the opening part periphery so as to cover the opening part, wherein the oxygen-permeable membrane is constituted from a thermoplastic resin membrane and inorganic particles having pores having pore diameter of 10 Å or less contained in the thermoplastic resin membrane, wherein the thermoplastic resin membrane has one surface on which hydrophobic treatment was effected, and the one surface of the thermoplastic resin membrane on which hydrophobic treatment was effected is directed to the armouring sheet side.

[6] The armouring material for the use of an air secondary battery as set forth in [5], wherein the inorganic porous particles are made of one or more selected from the group consisting of zeolite, anodic oxidation alumina, porous alumina, porous titania, porous zirconia, porous carbon, and porous silica.

[7] The armouring material for the use of an air secondary battery as set forth in [5] or [6], wherein the thermoplastic membrane is made of polyethylene, polypropylene, polystyrene resin or polyurethane resin.

[8] The armouring material for the use of an air secondary battery as set forth in any one of [5] to [7], wherein the hydrophobic treatment is applying of silane treatment agent having hydrophobic functional groups.

[9] The armouring material for the use of an air secondary battery as set forth in any one of [5] to [8], wherein one or both of the joining surface of an outer periphery of the oxygen-permeable membrane and/or an opening part periphery is applied with silane coupling agent having reactive functional group.

[10] The armouring material for the use of an air secondary battery as set forth in [9], wherein the reactive functional group has any one selected from the group consisting of a vinyl group, an epoxy group, a styryl group, a methacryl group, an acryl group, an amino group, an ureido group, a mercapto group, a sulfide group, and an isocyanate group, at the end thereof

[11] The armouring material for the use of an air secondary battery as set forth in any one of [5] to [10], wherein each of the armouring sheet and the oxygen-permeable membrane is contact bonded or adhered with each other.

[12] The air secondary battery comprising the oxygen-permeable membrane for the use of an air secondary battery as set forth in any of [1] to [4].

[13] The air secondary battery comprising the armoring material for the use of an air secondary battery as set forth in any of [5] to [11].

Effect of the Invention

According to the present invention, since the inorganic porous particles having pores with pore diameter of 10 Å or less are contained in the thermoplastic resin membrane, it is possible to prevent the electrolyte from leaking out, while passing oxygen through the pore, and to improve water-barrier property by hydrophobic treatment effected on one surface of the thermoplastic membrane.

In addition, according to the armouring material for air secondary battery of the present invention, since the oxygen permeable membrane made of thermoplastic resin membrane is joined to the inner layer including thermoplastic resin film, the joining ability between the oxygen permeable membrane and the armouring sheet can be improved. As a result, it is possible to prevent leakage of electrolyte and penetration of water through the joining portion between the oxygen permeable membrane and the armouring sheet. In addition, since the oxygen permeable membrane is constituted from the inorganic particles having pores with pore diameter of 10 Å or less, and the thermoplastic resin membrane containing the inorganic particles, it is possible to prevent the electrolyte from leaking out by the oxygen permeable membrane per se, while passing oxygen through the pores, and to improve water-barrier performance by the hydrophobic treatment effected on one surface of the thermoplastic resin membrane.

Moreover, according to the air secondary battery of the present invention, since the air secondary battery is equipped with the oxygen permeable membrane or the armouring material in the above, it is possible to introduce oxygen to the inside of the air secondary battery, and to prevent leaking out of the electrolyte and penetration of water, to realize an air secondary battery having excellent performance and long life.

DETAILED DESCRIPTION OF THE INVENTION

Figure 1:
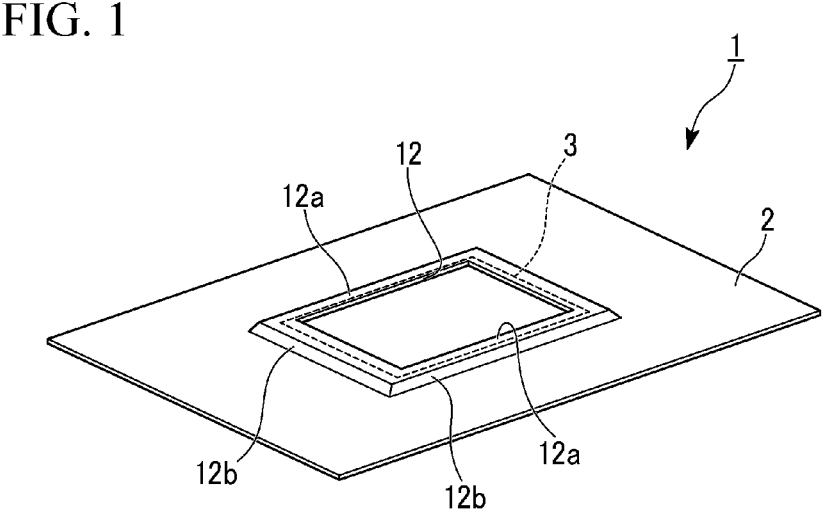
FIG. 1 is an oblique view showing an embodiment of the armouring material for air secondary battery of the present invention.

An embodiment of the present invention will be explained below, with referring to the drawings.

[Armouring Material for an Air Secondary Battery]

Figure 2:
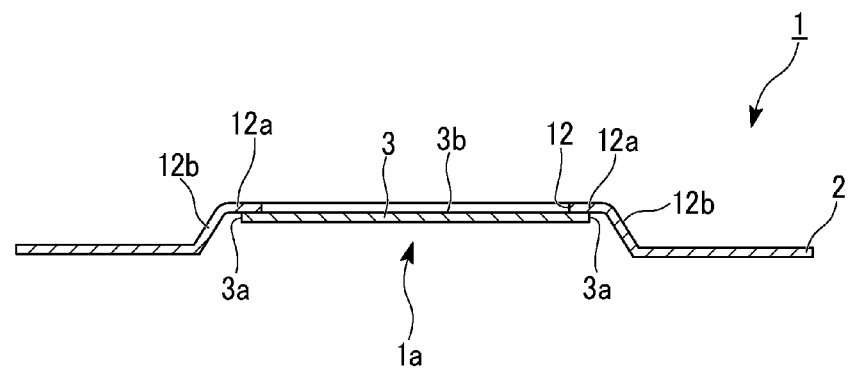
FIG. 2 is a cross-section showing an embodiment of the armouring material for air secondary battery of the present invention.
Figure 3:
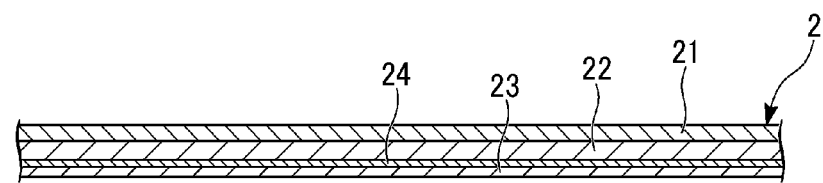
FIG. 3 is a partial cross-section showing the armouring material constituting an embodiment of the armouring material for air secondary battery of the present invention.

The armouring material 1 (it will be called as an armouring material below) which is a preferred one of this embodiment is, as shown in FIGS. 1 and 2, constituted from the armouring sheet 2 which is equipped with the opening part 12 for taking oxygen in, and the oxygen permeable membrane 3 which is joined to the opening part periphery 12*a* so as to cover the opening part 12. The armouring sheet 2 is, as shown in FIG. 3, constituted by laminating at least the outer layer 21, metal foil layer 22, and the inner layer 23. It should be noted that, in the embodiment shown in FIG. 3, the adhesive layer 24 for laminating is disposed into between the metal foil layer 22 and the inner layer 23. The opening part 12 for taking oxygen in is formed to perforate through the outer layer 21, the metal layer 22, the adhesive layer 24, and the inner layer 23. The oxygen permeable membrane 3 is joined to the inner side of the armouring sheet 2.

More in detail, the armouring sheet 2 is equipped with the slant part 12*b* having a ring shape which is pressed to protrude to the outer layer side, and the opening part periphery 12*a* which is connected to the slant part 12*b*, and the opening part 12 is surrounded by the opening part periphery 12*a*. To the inner layer side of the opening part periphery 12*a*, the oxygen permeable membrane 3 is joined over all-around of the opening part periphery 12*a*. The oxygen permeable membrane 3 is larger than the opening part 12, and the part which is run out from the opening part 12 serves as the outer periphery 3*a* of the oxygen permeable membrane 3, and the outer periphery 3a is joined to the inner layer side of the opening part periphery 12a.

In addition, to the joining surface of either or both of the outer periphery 3a of the oxygen permeable membrane 3 and the opening part periphery 12a, silane coupling agent having reactive functional groups is applied over all-around the joining surface. Moreover, on the one surface 3b of the oxygen permeable membrane 3, hydrophobic treatment is effected, and the oxygen permeable membrane 3 is joined to the armouring sheet 2 such that the one surface 3b on which hydrophobic treatment is effected is directed to the armouring sheet 2 side.

As a mode of joining the oxygen permeable membrane 3 to the opening part periphery 12a, the oxygen permeable membrane 3 may be contact bonded to the opening part periphery 12a, or an adhesive layer may be formed between the oxygen permeable membrane 3 and the opening part periphery 12a to adhere them.

In addition, by forming a ring-shaped slant part 12b and the opening part periphery 12a in the armouring sheet 2, and further by joining the oxygen permeable membrane 3 to the opening part periphery 12a, the recess 1a is formed at the inner layer side of the armouring material 1. Into the recess 1a, a negative electrode or an air electrode of an air secondary battery is contained.

It will be explained in detail below, with respect to the constitutional members of the armouring material 1.

(Armouring Sheet)

The armouring sheet 2 is, as mentioned above, constituted by laminating the outer layer 21, the metal foil layer 22, and the inner layer 23. In the gap between the inner layer 23 and the metal foil layer 22, the adhesive layer 24 is interposed.

In addition, in the gap between the outer layer 21 and the metal foil layer 22, not-shown adhesive layer is interposed.

<Outer Layer>

The outer layer 21 is constituted from at least one or more of heat-resistant resin film. The outer layer 21, in the case in which it is constituted from two or more of heat-resistant resin films, is preferably constituted by laminating two or more of heat-resistant resin films, with interposing an adhesive layer therebetween.

The heat-resistant resin film constituting the outer layer 21 serves to secure formability upon forming the recess 1a in the armouring material 1. A stretched film of polyamide(nylon) or polyester resin is preferably used. In addition, the melting point of the heat-resistant resin film constituting the outer layer 21 is preferably higher than the melting point of the thermoplastic resin film constituting the inner layer 23. As a result, it becomes possible to conduct heat sealing certainly of the armouring material 1 in producing air secondary battery.

The thickness of the outer layer 21 preferably ranges around from 10 to 50 μm, more preferably around from 15 to 30 μm. If the thickness is 10 μm or higher, then elongation of stretched film is unlikely to run short, when molding the armouring material 1, necking is unlikely to occur in the metal foil layer 22, and molding failure is unlikely to occur. In addition, if thickness is 50 μm or less, then the effect of formability can be sufficiently provided.

<Metal Foil Layer>

The metal foil layer 22 serves to secure barrier performance of the armouring material 1, and aluminum foil, stainless foil, and copper foil etc. is used. Aluminum foil is preferably used, in view of the formability and light weight. As a material for the aluminum foil, O-material(soft material) of pure aluminum base or aluminum-iron base alloy is preferably used.

It is necessary that thickness of the metal foil layer 22 ranges from 20 to 80 μm to secure processability and barrier performance preventing oxygen or water from penetrating into the interior of the air secondary battery. If thickness is 20 μm or more, then breaking of the metal foil layer 22 is unlikely to occur when molding the armouring material 1, pinholing is unlikely to occur, thereby penetration of oxygen or water can be prevented. In addition, if thickness is 80 μm or less, then improving effect of breaking or preventing effect of pinholing when molding can be held, and further, total thickness of the armouring material 1 does not excessively increase, increasing of weight can be prevented, thereby improving the volume energy density of the air secondary battery.

In addition, with respect to the metal foil layer 22, undercoating treatment by silane coupling agent or titan coupling agent, or chemical conversion treatment by chromate conversion treatment is preferably performed, in order to improve adhesiveness to the outer layer 21 and the inner layer 23, or corrosion resistance.

<Inner layer>

Next, the inner layer 23 is constituted from a thermoplastic resin film. As the thermoplastic resin film used in the inner layer 23, preferred are those having heat sealing property, serving to improve chemical resistance against highly corrosive electrolyte for the use of an air secondary battery, and being capable of securing insulating properties between the metal foil layer 22 and an air electrode or a negative electrode of an air secondary battery, for example, unstretched polyolefin film such as polypropylene, malleic acid modified polypropylene, and unstretched film such ethylene-acrylate copolymer and ionomer resin is preferably used.

In particular, as the inner layer 23, acid modified polyolefin is preferred, carboxylic acid modified polyolefin film is more preferred, for example, maleic anhydride modified polyethylene or maleic anhydride modified polypropylene etc. is preferred. As a result of using an acid modified polyethylene film as the inner layer 23, as well as applying silane coupling agent to the inner layer 23 or the oxygen permeable membrane 3, joining strength of the oxygen permeable membrane 3 can be further improved.

Thickness of the inner layer 23 ranges preferably from 0.1 to 200 μm, more preferably from 50 to 100 μm. If thickness is 0.1μm or more, preferably 50 μm or more, then heat sealing strength becomes sufficient, and corrosion resistance to the electrolyte can be improved, and the insulative property between the metal foil layer 22 and the negative electrode can be improved. In addition, if thickness is 200 μm or less, preferably 100 μm or less, then both the heat sealing property and the chemical resistance are not affected, and further, the volume energy density of the air secondary battery can be improved.

In addition, the thermoplastic resin film constituting the inner layer 23 may be composed of either a single thermoplastic resin layer, or a laminated one of plural thermoplastic resin layers. As a specific example of the inner layer constituted from plural thermoplastic resin layers, for example, a three-layered film composed of an intermediate layer and a pair of covering layers laminated on both sides in the direction of thickness with putting the intermediate layer therebetween can be exemplified.

The melting point of the thermoplastic resin film constituting the inner layer 23 ranges preferably from 130° C. to 170° C., more preferably from 160° C. to 165° C. If the melting point is within the range, then heat-resistance of the inner layer 23 can be improved, the thickness of the inner layer 23 upon heat sealing is not likely to decrease, thereby the heat resistance of the inner layer 23 can be improved.

<Adhesive Layer>

The adhesive layer 24 for laminating is disposed between the inner layer 23 and the metal foil layer 22 to adhere the inner layer 23 with the metal foil layer 22.

In addition, between the outer layer 21 and the metal foil layer 22, an adhesive layer is disposed.

As for the adhesive layer, an adhesive layer for use in a dry laminate is preferable, and for example, it is possible to use at least one selected from the group consisting of urethane type, acid modified polyolefin, styrene elastomer, acrylic type, silicone type, ether type, and ethylene-vinyl acetate type.

Thickness of the adhesive layer ranges preferably from 0.1 to 10 μm, more preferably from 1 to 5 μm. If thickness of the adhesive layer is 0.1 μm or more, then adhesive strength does not decrease, and at the side of the inner layer, insulating property can be improved further. In addition, if thickness of the adhesive layer is 10 μm or less, then deterioration of adhesive strength can be prevented.

In particular, with respect to each of the adhesive layer at the outer layer side and the adhesive layer 24 at the inner layer side, it is preferable to use an adhesive layer made of material being different from each other.

As a combination of material for the adhesive layer, preferably, urethane type adhesion is used as the adhesive at the outer layer side in the case in which the outer layer 21 is constituted from PET or nylon, whereas in the case in which the inner layer 23 is constituted from polypropylene or an acid modified polypropylene, an acrylic type adhesion or an acid modified type adhesion is preferably used as the adhesive at the inner layer side.

By using adhesion of which material is different from each other, as the adhesive layer of the outer layer side and the adhesive layer 24 of the inner layer side, respectively, it is possible to provide the adhesive strength and the electrolyte-resistance between each of material.

In addition, the inner layer 23 and the metal foil layer 22 may be laminated to each other, similarly to the case of the outer layer 21, with intervening the adhesive layer 24 therebetween, or, may be adhered to each other by heat-laminating by using heat-adhesive resin having excellent heat-resistance and electrolyte-resistance, in this case, it is possible to obtain further improved adhesiveness between the inner layer 23 and the metal foil layer 22. In this case, heat-laminating is performed by extruding the heat-adhesive resin such as maleic anhydride modified polypropylene obtained by modifying maleic anhydride, into the gap between the metal foil layer 22 and the inner layer 23. However, it is more cost-effective to use polyolefin in the same line as the thermoplastic resin film of the inner layer 23, such as a co-extrusion resin of polypropylene and modified polypropylene resin to heat laminate the metal foil layer 22 with modified polypropylene, and the inner layer with polypropylene, respectively, than using modified heat adhesive resin in a single layer.

(Oxygen Permeable Membrane)

The oxygen permeable membrane 3 serves to pass oxygen therethrough between outside air and an air electrode of an air secondary battery, and to prevent leaking out of electrolyte from the inside of a battery and penetration of water or carbon dioxide into the inside of a battery.

The oxygen permeable membrane 3 in this embodiment is constituted from a thermoplastic resin membrane and inorganic particles having pores having pore diameter of 10 Å or less contained in the thermoplastic resin membrane, in which the thermoplastic resin membrane has one surface on which hydrophobic treatment is effected. By packing inorganic porous particles into thermoplastic resin membrane having low oxygen permeability, the pores in the inorganic porous particles serve as pathways of oxygen in the oxygen permeable membrane.

The thermoplastic resin membrane is preferably those having heat-sealing property with respect to the inner layer 23, i.e., any of polyethylene, polypropylene, polystyrene resin and polyurethane, more preferably any of polyethylene or polypropylene, and the most preferably polypropylene. By constituting the oxygen permeable membrane with thermoplastic resin, joining property of the oxygen permeable membrane 3 to the inner layer 23 of the armouring sheet 2 can be improved.

Thickness of the thermoplastic resin membrane is preferably 50 μm or less, more preferably 40 μm or less, and the most preferably 30 μm or less. In addition, the upper limit of thickness of thermoplastic resin membrane may be set to be 8 times or less of the maximum value of the particle diameter of the inorganic porous particles. If thickness of the thermoplastic resin membrane is 50 μm or less, or 8 times or less of the maximum value of the particle diameter of the inorganic porous particles, then the oxygen permeability of the oxygen permeable membrane 3 does not deteriorate, and it is possible to supply oxygen in a sufficient quantity to the inside of a battery. On the other hand, the lower limit of thickness of the thermoplastic resin membrane is preferably set to be 5 times or more of the maximum value of the particle diameter of the inorganic porous particles, more preferably to be 2 times or more. By setting the lower limit to thickness of the thermoplastic resin membrane to be 5 times or more of the maximum value of the particle diameter of the inorganic porous particles, it is possible to bind the inorganic porous particles sufficiently with the thermoplastic resin membrane, thereby preventing breaks and cracks of the oxygen permeable membrane to form a homogeneous membrane.

As the inorganic porous particles having pore diameter of 10 Å or less, any one or more of zeolite, anodic oxidation alumina, porous alumina, porous titania, porous zirconia, porous carbon, porous silica can be exemplified, in these zeolite is preferably used. In zeolite, it is preferable to use zeolite having Si/Al ratio of 100 or more, or pure silica type zeolite being almost Al free. In addition, as for zeolite, those having no metal seed in the skeleton is preferable. By using zeolite having Si/Al ratio of 100 or more, or pure silica type zeolite being almost Al free, adsorption of water to inorganic porous particles can be prevented, thereby suppressing invasion of water into the inside of the battery.

Pore diameter of the inorganic porous particles is preferably 10 Å or less, more preferably 3.5 Å or less.

If pore diameter is 10 Å or less, then leaking out of electrolyte outside a battery can be prevented. Moreover, by limiting pore diameter to be less than 3.5 Å, invasion of carbon dioxide into the inside of a battery can be prevented, in addition to prevention of leaking out of electrolyte. In order to secure oxygen permeability, it is preferable to set the lower limit of pore diameter to be 2.8 Å or less. If pore diameter is less than 2.8 Å, then it becomes very difficult for oxygen to permeate therethrough, it is not preferable. Since 3A type zeolite has pore diameter of 3 Å, 3A type zeolite is suitable for the inorganic porous particles of this embodiment.

An average particle size of the inorganic porous particles ranges preferably from 0.05 to 5 μm, more preferably from 0.05 to 0.1 μm. The maximum value of particle size of the inorganic porous particles ranges preferably from 0.5 to 10 μm, more preferably from 0.5 to 1.0 μm. If average particle size or the maximum value of particle size is the lower limit or more, then pathway of oxygen is not subdivided, thereby decreasing of oxygen permeability can be prevented. Whereas, if average particle size or the maximum value of particle size is the upper limit or less, then pathway of oxygen does not become to be too long, thereby decreasing of oxygen permeability can be prevented.

Content of the inorganic porous particles in the oxygen permeable membrane ranges preferably from 5 mass % to 95 mass %, more preferably from 20 mass % to 50 mass %. By setting the content of the inorganic porous particles to be the lower limit or more, sufficient pathway of oxygen in the oxygen permeable membrane can be secured to increase oxygen permeability. Whereas, by setting the content of the inorganic porous particles to be the upper limit or less, sufficient amount of the thermoplastic resin can be distributed into between the inorganic porous particles, breaks and cracks of the oxygen permeable membrane 3 can be prevented to form a homogeneous membrane, thereby heightening barrier properties against electrolyte and water.

As a hydrophobic treatment to be effected on one surface of the thermoplastic resin membrane, it is possible to exemplify a treatment of applying silane treatment having hydrophobic functional groups(which will be called as a hydrophobic silane treatment, below). By applying the hydrophobic silane treatment, hydrophobic groups are introduced to over one surface of the thermoplastic resin membrane, thereby suppressing invasion of water inside the air secondary battery, as well as heightening the joining strength between the inner layer 23 of the armouring sheet 2 and the oxygen permeable membrane 3.

As a hydrophobic function group of the hydrophobic silane treatment, an alkyl group of ring, straight chain, or branched chain of carbon number 1 can be exemplified. Applying amount of the hydrophobic silane treatment ranges preferably from 0.1 mg/m$^2$ to 10000 mg/m$^2$, more preferably from 0.1 mg/m$^2$ to 100 mg/m$^2$, and particularly preferably from 0.5 mg/m$^2$ to 1 mg/m$^2$. Specifically, as the hydrophobic silane treatment, chlorosilane, alkoxysilane, silazane can be exemplified.

As another method of effecting the hydrophobic treatment on one surface of the thermoplastic resin membrane, method of depositing evaporated hydrophobic silane treatment or method of laminating fluororesin can be adopted.

It should be noted that, onto the surface of the thermoplastic resin membrane being opposite to the armouring sheet 2 side thereof, hydrophobic treatment may be effected. However, electrolyte may come into contact with the surface of the thermoplastic resin membrane being opposite to the armouring sheet 2 side, and as a result, the effect of the hydrophobic treatment may be lost by the contact with electrolyte, and hence, it is better to perform hydrophobic treatment certainly on over one surface 3$b$ at the side of the armouring sheet 2 of the thermoplastic resin membrane.

(Silane Coupling Agent having Reactive Functional Groups)

In this embodiment, silane coupling agent having reactive functional groups (it will be called as a silane coupling agent, below) may be applied to either or both of the outer periphery 3$a$ of the oxygen permeable membrane 3 and the joining surface of the opening part periphery 12$a$ of the armouring sheet 2. The reactive functional group of the silane coupling agent has polar groups at its end, it is thought that because of the presence of the polar groups, the joining strength between the oxygen permeable membrane 3 and the armouring sheet 2 can be improved. It should be noted that in the case in which the oxygen permeable membrane 3 is joined with the armouring sheet 2 by an adhesive, silane coupling agent may be applied to either the oxygen permeable membrane 3 or the armouring sheet 2.

As the polar group present on the end of the reactive functional group of the silane coupling agent, for example, any one selected from the group consisting of vinyl group, epoxy group, styryl group, methacryl group, acryl group, amino group, ureido group, mercapto group, sulfide group, and isocyanate group, can be exemplified.

In order to improve the joining strength, applying amount of the silane coupling agent ranges preferably from 0.1 mg/m$^2$ to 10000 mg/m$^2$, more preferably from 0.1 mg/m$^2$ to 100 mg/m$^2$, and particularly preferably from 0.5 mg/m$^2$ to 1 mg/m$^2$.

Specifically, as the silane coupling agent, vinyl silane, methacryl silane, epoxy silane, mercapto silane, sulfur silane, amino silane, ureido silane, and isocyanate silane can be exemplified.

(Adhesive Layer)

As an adhesive in the case in which the oxygen permeable membrane 3 is joined with the armouring sheet 2 by adhering, for example, urethane type, acid modified polyolefin, styrene elastomer, acrylic type, silicone type, ether type, and ethylene-vinyl acetate type can be exemplified.

In order to secure sufficient adhering strength, thickness of the adhesive layer ranges preferably from 0.05 μm to 100 μm, more preferably from 0.1 μm to 5 μm.

(Production Method of the Oxygen Permeable Membrane)

As the production method of the oxygen permeable membrane, it can be produced by kneading the inorganic porous particles into the thermoplastic resin, then shaping the resultant mixture into a sheet. As the kneading method, those using pressing type kneader or twin-screw mixer can be exemplified.

As the method of shaping the kneaded product into a sheet, T-die extrusion process, tubular film process and hot pressing can be adopted. After shaping the kneaded product into a sheet, the resultant sheet may be roll-pressed further to be a predetermined thickness.

As the method of effecting hydrophobic treatment on one surface 3$b$ of the oxygen permeable membrane 3, for example, dispersing hydrophobic silane in a solvent to obtain dispersion, then applying the resultant dispersion to the oxygen permeable membrane 3, or immersing the oxygen permeable membrane 3 in the resultant dispersion, thereafter heating and removing the solvent therefrom.

[Production Method of the Armouring Material for the Air Secondary Battery]

Next, production method of the armouring material 1 will be explained below.

The production method of the armouring material 1 which is a preferred embodiment of the present invention is constituted from the step of joining the oxygen permeable membrane 3 to the opening part periphery 12$a$ of the armouring sheet 2. In addition, prior to this joining step, there may be the step of applying silane coupling agent to the joining surface of either or both of the opening part periphery 12$a$ of the armouring sheet 2 and the outer periphery 3$a$ of the oxygen permeable membrane 3.

As the step of applying silane coupling agent, for example, dispersing silane coupling agent in a solvent to obtain dispersion, then applying the resultant dispersion to the opening part periphery 12$a$ or the outer periphery 3$a$ of the oxygen permeable membrane 3, or immersing the armouring sheet 2 or the oxygen permeable membrane 3 in the resultant dispersion, thereafter heating and removing the solvent therefrom.

Next, in the case in which the opening part periphery 12$a$ of the armouring sheet 2 and the oxygen permeable membrane 3 are joined with each other by thermocompression bonding, for example, it is preferable to set the starting pressure of thermocompression bonding to be within the range of 0.05 to 0.5 MPa, bonding pressure to be within the range of 0.1 to 1 MPa, the bonding temperature to be within the range of 120 to 230° C., and the bonding time to be within the range of 0.5 sec. to 1 min., respectively. By setting the starting pressure of thermocompression bonding within the range above, Cracking of the oxygen permeable membrane 3 can be prevented. In addition, by setting the bonding pressure, the bonding temperature, and the bonding time within the ranges above respectively, the joining strength can be heightened sufficiently.

In addition, in the case in which the opening part periphery 12a of the armouring sheet 2 and the oxygen permeable membrane 3 are joined with each other by adhering, for example, by applying acrylic type adhesive or acid modified olefin type adhesive to the adhering surface, then drying to adhere them with each other.

Figure 4:
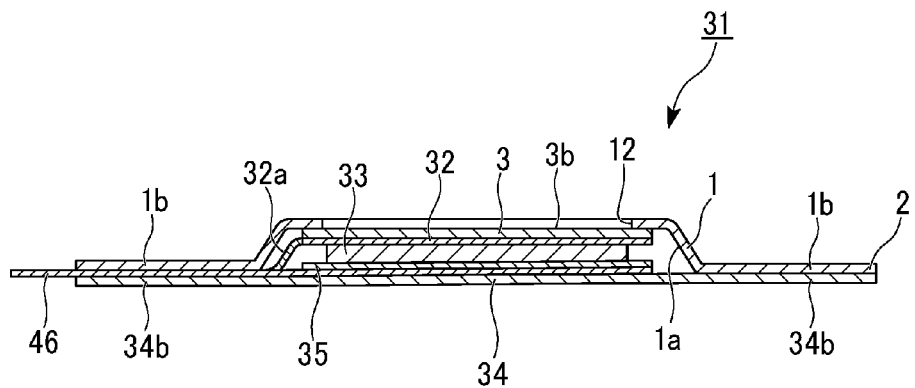
FIG. 4 is a partial cross-section showing an example of the embodiment of the air secondary battery of the present invention.
Figure 5:
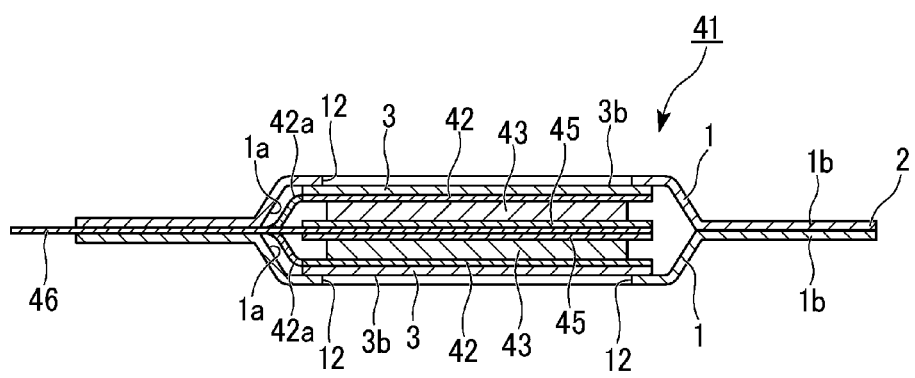
FIG. 5 is another partial cross-section showing an example of the embodiment of the air secondary battery of the present invention.

In FIGS. 4 and 5, an air secondary battery using the armouring material 1 in the above is shown.

The air secondary battery shown in FIGS. 4 and 5 is a lithium air secondary battery using lithium as the negative electrode active material.

The lithium air secondary battery 31 shown in FIG. 4 is constituted from at least the air electrode 32, the negative electrode 33, the electrolyte, and the armouring material 1 and 34 casing the air electrode 32, the negative electrode 33, and the electrolyte.

The armouring material 1 is arranged at the air electrode 32 side, the oxygen permeable membrane 3 which is joined to the armouring sheet 1 is laminated on the air electrode 32. The air electrode 32 is connected to the air electrode lead 32a.

The air electrode lead 32a is extruded outside the armouring material 1 and 34, as a positive electrode. In addition, the armouring material 34 is arranged at the negative electrode 33 side. The armouring material 34 for use in a battery is constituted from the same laminated body as the armouring sheet 2 which constitutes the armouring material 1. The outer periphery 1b and 34b of the armouring material 1 and 34 are heat sealed with each other and shaped into approximately bag-like shape. The air electrode 32, the negative electrode 33 and the electrolyte are inserted into the gap between the armouring material 1 and 34 and arranged at the recess 1a of the armoring material 1. In addition, a separator may be arranged at the gap between the air electrode 32 and the negative electrode 33, if necessary.

The air electrode 32 is constituted by laminating the catalyst layer and the oxygen diffusion layer. The oxygen diffusion layer diffuses oxygen permeated through the opening part 12 and oxygen permeable membrane 3 over whole surface of the catalyst layer. In addition, the catalyst layer captures oxygen to cause electrode reaction.

The negative electrode 33 is, for example, constituted from metallic lithium foil. The negative electrode 33 is crimped to the collector 35 made of metal. The collector 35 is connected to the negative electrode lead 36. The negative electrode lead 36 is extruded outside the armouring material 1, 34 as a negative terminal.

In the case in which the lithium air secondary battery 31 shown in FIG. 4 is produced, the armouring material 1, 34 are heat sealed with each other to form a bag-shaped body, the collector 35 and the negative lead 36 are integrated with the negative electrode 33, the separator and the air electrode 32 are laminated on the negative electrode 33, the negative electrode 33, the separator and the air electrode 32 are inserted into the recess 1a of the armouring material 1 through an opening of the bag-shaped body, after electrolyte is poured the opening is heat sealed finally to obtain the lithium air secondary battery 31.

In addition, the lithium air secondary battery 41 shown in FIG. 5 is constituted from at least the air electrode 42, the negative electrode 43, the electrolyte, and the armouring material 1, 1 casing the air electrode 42, the negative electrode 43 and the electrolyte. In the example shown in FIG. 5, to both surfaces of the negative electrode lead 46, the collector 45, 45, the negative electrode 43, 43 made of metallic lithium foil, the air electrode 42, 42 are piled up sequentially, the armouring material 1, 1 are laminated mutually so as to put the negative electrode lead 46 and the air electrode lead 42a therebetween, and heat sealed.

In the case in which the lithium air secondary battery 41 shown in FIG. 5 is produced, the armouring material 1, 1 are heat sealed with each other to form a bag-shaped body, the collector 45 and the negative lead 46 are integrated with the negative electrode 43, the separator and the air electrode 42 are laminated on the negative electrode 43, the negative electrode 43, the separator and the air electrode 42 are inserted into the recess 1a, 1a of the armouring material 1, 1 through an opening of the bag-shaped body, after electrolyte is poured the opening is heat sealed finally to obtain the lithium air secondary battery 41.

It should be noted that in the example shown in FIGS. 4 and 5, it is explained referring to a lithium air secondary battery, however, the present invention is not limited thereto, for example, the present invention may be applied to an aluminum air secondary battery using aluminum as a negative electrode active material.

As explained above, according to the oxygen permeable membrane 5 for use in the air secondary battery, which is a preferred embodiment of the present invention, since the inorganic porous particle having pore diameter of 10 Å or less is contained in the thermoplastic resin membrane, it is possible to prevent electrolyte from leaking out, while passing oxygen through the pore, and further to heighten barrier property to water, by the hydrophobic treatment effected on one surface of the thermoplastic resin membrane.

In addition, according to the armouring material 1 for the air secondary battery which is a preferred embodiment of the present invention, since the oxygen permeable membrane 3 constituted from the thermoplastic resin membrane is joined to the inner layer 23 including the thermoplastic resin film, the joining strength between the oxygen permeable membrane 3 and the armouring sheet 2 can be heightened. As a result, leaking out of electrolyte and invasion of water through the joining part between the oxygen permeable membrane 3 and the armouring sheet 2 can be prevented. In addition, since in the oxygen permeable membrane 3, the inorganic porous particles having pore diameter of 10 Å or less are contained in the thermoplastic resin membrane, it is possible to prevent electrolyte from leaking out by the oxygen permeable membrane per se, while passing oxygen through the pores, and further, barrier property to water of the oxygen permeable membrane per se can be heightened by the hydrophobic treatment effected on one surface of the thermoplastic resin membrane.

Moreover, according to the air secondary battery which is a preferred embodiment of the present invention, since the battery is equipped with the oxygen permeable membrane 3 or the armouring material 1 above, oxygen can be introduced into the inside of the battery, and leaking out of electrolyte and invasion of water can be prevented, thereby realizing an air secondary battery having excellent performance and long-life.

EXAMPLE

Example 1

Pure silica zeolite having average particle size of 0.5 μm, the maximum value of particle size of 1 μm, and no Al and metallic seed in the skeleton was prepared (Si/AL=∞).

The pore diameter of the pure silica zeolite was 3 Å. This pure silica zeolite and polypropylene resin (PH943B produced by SAN AROMER) were mixed at the mass ratio of 50:50 and kneaded, and then shaped into a sheet by T-die extrusion method to obtain a zeolite containing sheet having thickness of 40 μm.

Subsequently, hydrophobic treatment was performed to the resultant zeolite containing sheet. At first hexadecyl chloro silane (hydrophobic silane treatment) and toluene (solvent) were mixed at the mass ratio of hexadecyl chloro silane: toluene=10:100 to obtain a mixed solution, the zeolite containing sheet was immersed in the resultant mixed solution and was heated at a temperature of 50° C. for 2 hours. Thereafter, toluene washing and vacuum drying were conducted to remove the excess of hexadecyl chloro silane and the residual toluene therefrom. As a result of this operation, bulky functional groups (hexadecyl group) were given to the surface of the zeolite containing sheet to develop hydrophobicity. The applied amount of was 1 mg/m$^2$. Thus, the oxygen permeable membrane of Example 1 was prepared.

Subsequently, the outer periphery of the oxygen permeable membrane of Example 1 and the armouring sheet in which an opening was perforated previously and a recess was shaped were prepared, and the oxygen permeable membrane and the armouring sheet were subjected to contact bonding using a heat-sealer. As for contact bonding condition, the outer layer side of the armouring sheet was heated at 200° C., the inner layer side was heated at 100° C., the sealing pressure was 0.2 MPa, and the sealing time was 2 seconds. Thus, the armouring material of Example 1 was prepared.

The armouring material of Example 2 was prepared by the same way as in Example 1, with the exception that the resultant kneaded product was shaped into a sheet by hot-pressing method, instead of T-die extrusion method.

Example 3

The armouring sheet of Example 3 was prepared by the same way as in Example 1, with the exception that the zeolite having pore diameter of 9.5 Å and 7.4 Å(UTD-1) was used, instead of the zeolite having pore diameter of 3 Å.

Comparative Example 1

The armouring material of Comparative Example 1 was prepared by the same way as in Example 1, with the exception that PTEF film (produced by TECH. JAM. HANBAI Co., Ltd. KN3344860) having thickness of 100 μm was used instead of the aforementioned oxygen permeable membrane.

Comparative Example 2

The armouring material of Comparative Example 2 was prepared by the same way as in Example 1, with the exception that a polypropylene film (produced by OKAMOTO Co., Ltd. ET-20C) having thickness of 40 μm was used instead of the aforementioned oxygen permeable membrane.

Comparative Example 3

The armouring material of Comparative Example 3 was prepared by the same way as in Example 1, with the exception that a mesoporous silica (MCM-48) having pore diameter of 28 Å was used instead of the aforementioned zeolite, and that hydrophobic treatment was not effected on the sheet.

Comparative Example 4

The armouring material of Comparative Example 4 was prepared by the same way as in Example 1, with the exception that a zeolite having a composition of Si/Al ratio=10 was used, and that hydrophobic treatment was not effected on the sheet.

With respect to the obtained armouring material, peel strength between the oxygen permeable membrane and the armouring sheet was evaluated. As for the condition, in addition to the condition of stress free, with respect to each of after immersing the armouring material in water for 24 hours and after immersing the armouring material in electrolyte for 24 hours, peel strength was evaluated. Peel strength was measured according to MS K 6854-2, under a condition that the oxygen permeable membrane was fixed. That is, an armouring sheet on which the oxygen permeable sheet was cut into a test pieces having a width of 15 mm, with respect to the resultant test piece, peel strength between the oxygen permeable membrane and the armouring sheet was evaluated. It should be noted that in the immersing in water, ion exchanged water was used, whereas as a non-aqueous electrolyte, an electrolyte prepared by dissolving 1 mol/L of LiPF$_6$ into a mixed solvent consisting of ethylene carbonate and diethyl carbonate at volume ratio of 1:1 was used, respectively. The result is shown in Table 1.

As shown in Table 1, no significant deterioration of performance was not seen in Examples 1, 2 and 3 compared to Comparative Example 2. In addition, in Comparative Example 1, it was not able to join the armouring sheet to the oxygen permeable membrane.

TABLE 1

|  | Seal strength | Seal strength measurement after immersing in water (24 h) | Seal strength measurement after immersing in non-aqueous electrolyte (24 h) | Seal strength measurement after immersing in aqueous electrolyte (24 h) |
|---|---|---|---|---|
| Example 1 | 40 N/15 mm | 35 N/15 mm | 27 N/15 mm | 22 N/15 mm |
| Example 2 | 38 N/15 mm | 37 N/15 mm | 30 N/15 mm | 28 N/15 mm |
| Example 3 | 39 N/15 mm | 38 N/15 mm | 31 N/15 mm | 25 N/15 mm |
| Comparative Example 1 | cannot seal | cannot seal | cannot seal | cannot seal |
| Comparative Example 2 | 45 N/15 mm | 41 N/15 mm | 35 N/15 mm | 31 N/15 mm |
| Comparative Example 3 | 41 N/15 mm | 34 N/15 mm | 29 N/15 mm | 25 N/15 mm |
| Comparative Example 4 | 35 N/15 mm | 33 N/15 mm | 28 N/15 mm | 26 N/15 mm |

In addition, as shown in FIG. 4, the armouring material 1 and the armouring material 34 were heat sealed with each other to produce a bag-shaped body, non-aqueous electrolyte in which stain solution was added was packed into the bag-shape body and then sealed to obtain a bag, and the presence or absence of leaking out therefrom was evaluated. For coloring of the electrolyte, 1 wt. % of rhodamine B ethanol solution was used, this solution in an amount of 1 volume % was added to the electrolyte. As the electrolyte, an electrolyte prepared by dissolving 1 mol/L of LiPF$_6$ into a mixed solvent consisting of ethylene carbonate and diethyl carbonate at volume ratio of 1:1 was used. The result is shown in Table 2.

No leaking out of the electrolyte was not seen in Examples 1, 2 and 3, even after 30 days later. On the other hand, in Comparative Example 1, it was not able to join the armouring sheet to the oxygen permeable membrane.

TABLE 2

|  | 1 hour later | 1 day later | 30 days later |
| --- | --- | --- | --- |
| Example 1 | no leaking | no leaking | no leaking |
| Example 2 | no leaking | no leaking | no leaking |
| Example 3 | no leaking | no leaking | no leaking |
| Comparative Example 1 | cannot seal | cannot seal | cannot seal |
| Comparative Example 2 | no leaking | no leaking | no leaking |
| Comparative Example 3 | no leaking | no leaking | no leaking |
| Comparative Example 4 | no leaking | no leaking | no leaking |

In addition, with respect to the oxygen permeable membrane of Examples 1 to 3 and Comparative Examples 1 to 2, permeated amount of oxygen was measured according to the differential pressure expression gas permeation test specified in JIS K7126-1. Results are shown in Table 3. In addition, with respect to the oxygen permeable membrane of Examples 1 to 2 and Comparative Examples 1 to 2, permeated amount of water vapor was measured according to the water vapor permeation test specified in JIS K7129. Results are shown in Table 4. In Table 4, water vapor permeability and $O_2/H_2O$ permeation ratio are shown together.

As shown in Table 3, in Examples 1, 2 and 3, the permeated amount of oxygen was sufficient, whereas in Comparative Examples 1 and 2, the permeated amount of oxygen was not sufficient. In addition, as shown in Table 4, in Comparative Examples 3 and 4, water vapor permeability was significantly high, compared to the other test examples.

TABLE 3

|  | $O_2$ gas (99.99%) | Air |
| --- | --- | --- |
| Example 1 | sufficiently permeable | sufficiently permeable |
| Example 2 | sufficiently permeable | sufficiently permeable |
| Example 3 | sufficiently permeable | sufficiently permeable |
| Comparative Example 1 | cannot seal | cannot seal |
| Comparative Example 2 | a small amount is permeable | hardly permeable |
| Comparative Example 3 | sufficiently permeable | sufficiently permeable |
| Comparative Example 4 | sufficiently permeable | sufficiently permeable |

TABLE 4

|  | water vapor permeability | $O_2/H_2O$ permeation ratio |
| --- | --- | --- |
| Example 1 | 2.0 g/m² (24 h) | 1000 |
| Example 2 | 1.7 g/m² (24 h) | 1200 |
| Example 3 | 2.5 g/m² (24 h) | 500 |
| Comparative Example 1 | cannot seal | cannot seal |
| Comparative Example 2 | 1.6 g/m² (24 h) | 4 |
| Comparative Example 3 | 50 g/m² (24 h) | 8 |
| Comparative Example 4 | 15 g/m² (24 h) | 3 |

DENOTATION OF REFERENCE NUMERALS

1 . . . the armouring material for an air secondary battery, 2 . . . the armoring sheet, 3 . . . the oxygen permeable membrane, 3a . . . the outer periphery of the oxygen permeable membrane, 12 . . . the opening part, 12a . . . the opening part periphery, 21 . . . the outer layer, 22 . . . the metallic foil layer, 23 . . . the inner layer, 31, 41 . . . the air secondary battery.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An armouring material for use in an air secondary battery, comprising
    an armouring sheet constituted by laminating an outer layer including heat-resistant resin film, a metal foil layer, and an inner layer including a thermoplastic resin film, being equipped with an opening part for taking oxygen in, perforating through the outer layer, the metal foil layer and the inner layer, and
    an oxygen-permeable membrane being joined to an inner layer side in an opening part periphery so as to cover the opening part,
    wherein the oxygen-permeable membrane is constituted from a thermoplastic resin membrane and inorganic particles having pores having pore diameter of 10 Å or less contained in the thermoplastic resin membrane, wherein the thermoplastic resin membrane has one surface on which hydrophobic treatment was effected, and
    the one surface of the thermoplastic resin membrane on which hydrophobic treatment was effected is directed to the armouring sheet side.

2. The armouring material for use in an air secondary battery as set forth in claim 1, wherein the inorganic porous particles are made of one or more selected from the group consisting of zeolite, anodic oxidation alumina, porous alumina, porous titania, porous zirconia, porous carbon, and porous silica.

3. The armouring material for use in an air secondary battery as set forth in claim 1, wherein the thermoplastic membrane is made of polyethylene, polypropylene, polystyrene resin or polyurethane resin.

4. The armouring material for use in an air secondary battery as set forth in claim 1, wherein the hydrophobic treatment is applying of silane treatment agent having hydrophobic functional groups.

5. The armouring material for use in an air secondary battery as set forth in claim 1, wherein a joining surface of an outer periphery of the oxygen-permeable membrane and/or an opening part periphery is applied with silane coupling agent having a reactive functional group.

6. The armouring material for use in an air secondary battery as set forth in claim 5, wherein the reactive functional group has any one selected from the group consisting of a vinyl group, an epoxy group, a styryl group, a methacryl group, an acryl group, an amino group, an ureido group, a mercapto group, a sulfide group, and an isocyanate group, at the end thereof.

7. The armouring material for use in an air secondary battery as set forth in claim 1, wherein each of the armouring sheet and the oxygen-permeable membrane is contact bonded or adhered with each other.

8. An air secondary battery comprising the oxygen-permeable membrane for use in an air secondary battery as set forth in claim 1.

9. An air secondary battery comprising the armoring material for use in an air secondary battery as set forth in claim 1.

* * * * *